US008279447B2

(12) United States Patent
Pahk et al.

(10) Patent No.: US 8,279,447 B2
(45) Date of Patent: Oct. 2, 2012

(54) METHOD FOR MEASURING THICKNESS

(75) Inventors: Heui-Jae Pahk, Seoul (KR);
Young-Min Hwang, Seoul (KR);
Woo-Jung Ahn, Gyeonggi-do (KR)

(73) Assignee: Snu Precision Co., Ltd., Seoul (KR)

( * ) Notice: Subject to any disclaimer, the term of this patent is extended or adjusted under 35 U.S.C. 154(b) by 269 days.

(21) Appl. No.: 12/746,548

(22) PCT Filed: Apr. 1, 2008

(86) PCT No.: PCT/KR2008/001833
§ 371 (c)(1),
(2), (4) Date: Jun. 7, 2010

(87) PCT Pub. No.: WO2009/096633
PCT Pub. Date: Aug. 6, 2009

(65) Prior Publication Data
US 2010/0277745 A1    Nov. 4, 2010

(30) Foreign Application Priority Data
Jan. 31, 2008  (KR) .......................... 10-2008-0010300

(51) Int. Cl.
*G01B 11/02* (2006.01)
(52) U.S. Cl. ...................................................... 356/503
(58) Field of Classification Search .................. 356/496, 356/498, 503, 504
See application file for complete search history.

(56) References Cited

U.S. PATENT DOCUMENTS

| 5,129,724 | A  | * | 7/1992  | Brophy et al. ............... 356/503 |
| 5,909,282 | A  | * | 6/1999  | Kulawiec ..................... 356/504 |
| 6,545,763 | B1 |   | 4/2003  | Kim et al. |
| 7,177,030 | B2 | * | 2/2007  | Leizerson et al. ........... 356/504 |
| 7,428,057 | B2 |   | 9/2008  | De Lega et al. |
| 7,483,147 | B2 | * | 1/2009  | Kim et al. .................... 356/497 |
| 2006/0012582 | A1 |   | 1/2006 | De Lega |

FOREIGN PATENT DOCUMENTS

| JP | 2007506071 A | 3/2007 |
| JP | 2008506952 A | 3/2008 |
| WO | WO 2006078718 A1 | 7/2006 |

OTHER PUBLICATIONS

Search Report for PCT/KR2008/001833 dated Oct. 30, 2008, 2 pages.

* cited by examiner

*Primary Examiner* — Michael A Lyons
(74) *Attorney, Agent, or Firm* — Dority & Manning, P.A.

(57) ABSTRACT

Disclosed is a method for measuring a thickness of a subjecting layer attached on a base layer by means of an interferometer, which includes the steps of: obtaining a correlation equation of a phase difference with respect to thicknesses of sample layers, the thicknesses being different from each other, the sample layers being made from a material substantially equal to a material of the subjecting layer; obtaining a first interference signal with respect to an optical axial direction incident to the base layer at a boundary surface between an air layer and the base layer; obtaining a second interference signal with respect to the optical axial direction at a boundary surface between the subjecting layer and the base layer; obtaining a phase difference between a phase of the first interference signal and a phase of the second interference signal at respective heights substantially equal to each other with respect to the optical axial direction; and determining a thickness of the subjecting layer by inserting the phase difference into the correlation equation.

9 Claims, 6 Drawing Sheets

METHOD FOR MEASURING THICKNESS

CROSS REFERENCE TO RELATED APPLICATION

This application is the national stage entry of International Patent Application No. PCT/KR2008/001833 having a filing date of Apr. 1, 2008, which claims filing benefit of Korean Patent Application Number 10-2008-0010300 having a filing date of Jan. 31, 2008.

TECHNICAL FIELD

The present invention relates to a method for measuring a thickness, and more particularly to a method for measuring phase change of interference light with respect to a boundary surface between a transparent thin layer and a base layer so as to accurately measure thickness of the transparent thin layer having a thickness below micrometer.

BACKGROUND ART

Among various factors influencing quality of a semiconductor or a FPD in a semiconductor process and a FPD process, it is an important factor to control the thickness of a thin layer, so that it is necessary to directly monitor the thickness of the thin layer during the processes. 'A thin layer' is a base layer, i.e. a layer which is formed on a surface of a substrate while having an extremely minute thickness, and the thickness of the thin layer is within several tens of Å~several μm. In order to apply such a thin layer to a specific use, it is necessary to know the thickness, composition, and physical and optical characteristics thereof. Particularly, it has recently become a general tendency to form multi-super thin layers on a substrate so as to increase the degree of integration of a semiconductor device. In order to develop such a high integration semiconductor device, it is necessary to exactly control a property of a thin layer, including a thickness thereof which is a factor exerting a remarkable influence on its property. There are various methods for measuring the thickness of a thin layer used in a semiconductor process, an application process, etc. Among these methods, a mechanical method using a stylus, an optical method, etc. are the most typical methods. In an optical method, the thickness of a thin layer can be measured by using a white light interferometer.

FIG. 1 is a view illustrating an embodiment of a conventional method for measuring a thickness.

With reference to FIG. 1, a transparent thin layer, which is a subjecting layer for measurement of a thickness, is stacked on a base layer 10, and an air layer 30 is formed on the subjecting layer 120. A first surface 21 includes a boundary surface between the air layer 30 and the subjecting layer 20, and a second surface 11 includes a boundary surface between the subjecting layer 20 and the base layer 10. The subjecting layer 20 is slanted while having a thickness in a linear shape.

When an interference ray is irradiated toward one position 22 of the first surface 21, in which the thickness of the subjecting layer 20 is relatively thick, by using a typical white light interferometer, an interference signal 41 generated from the one position 22 of the first surface 21 and an interference signal 42 generated from one position 12 of the second surface are obtained. The interference signal 41 generated from the first surface and the interference signal 42 generated from the subjecting layer are fully spaced from each other so that they can be separated from each other. Therefore, the thickness of the subjecting layer 20 can be obtained at the position 22 by using a difference between maximized values of both interference signals 41 and 42.

However, at a position 23 where the subjecting layer 20 has a relatively thin thickness, it is impossible for the thickness of the subjecting layer 20 to be obtained through the above described method. Particularly, when an interference ray is irradiated toward another position 23 of the first surface 21, in which the thickness of the subjecting layer 20 is relatively thin, the interference signal generated from the position 23 of the first surface and the interference signal generated from a position 13 of the second surface are overlapped, thereby generating one interference signal 43. As such, through interference signals overlapped each other, which can be generated at a position having a thin thickness, each maximized value of the interference signals required for obtaining the thickness of the subjecting layer 20 can not be extracted. Therefore, there is a problem in that interference signals can not be used to a transparent subjecting layer 20 having a thin thickness.

DISCLOSURE OF INVENTION

Technical Problem

Accordingly, the present invention has been made to solve the above-mentioned problems occurring in the prior art, and the present invention provides a method for measuring a thickness, in which a correlation equation of a phase difference with respect to the thickness of a transparent thin layer is obtained at a boundary surface between the transparent thin layer and a base layer by using a previously prepared sample, and the thickness of the transparent thin layer having a thickness below micrometer can be accurately measured by using the correlation equation.

Technical Solution

In accordance with an aspect of the present invention, there is provided a method for measuring a thickness of a subjecting layer attacked on a base layer by means of an interferometer, which includes the steps of: obtaining a correlation equation of a phase difference with respect to thicknesses of sample layers, the thicknesses being different from each other, the sample layers being made from a material substantially equal to a material of the subjecting layer; obtaining a first interference signal with respect to an optical axial direction incident to the base layer at a boundary surface between an air layer and the base layer; obtaining a second interference signal with respect to the optical axial direction at a boundary surface between the subjecting layer and the base layer; obtaining a phase difference between a phase of the first interference signal and a phase of the second interference signal at respective heights substantially equal to each other with respect to the optical axial direction; and determining a thickness of the subjecting layer by inserting the phase difference into the correlation equation.

In the method for measuring a thickness, it is preferable that the step of obtaining a phase difference between a phase of a first interference signal and a phase of a second interference signal includes: obtaining a first signal value as a reference value from the first interference signal, setting a height, in which the first signal value is obtained with respect to the optical axial direction, as a first height, and setting a phase of the first signal value as a first phase; setting a signal value of the second interference signal, which is obtained at a height substantially equal to the first height, as a second signal value, and setting a phase of the second signal value as a second phase; and obtaining a phase difference between the first phase and the second phase.

In the method for measuring a thickness, it is preferable that the first interference signal and the second interference signal are an optical intensity, and the first signal value is a maximum value of the first interference signal.

In the method for measuring a thickness, it is preferable that the step of obtaining the correlation equation includes: preparing a sample layer having one thickness; obtaining a third interference signal with respect to the optical axial direction at the boundary between the air layer and the base layer; obtaining a fourth interference signal with respect to the optical axial direction at a boundary surface between the sample layer and the base layer; obtaining a phase difference between a phase of the third interference signal and a phase of the fourth interference signal at respective heights substantially equal to each other with respect to the optical axial direction; preparing a sample layer having another thickness; repeatedly performing the step of obtaining the third interference signal, the step of obtaining the fourth interference signal, and the step of obtaining the phase difference with respect to the sample layer; performing a curve line fitting by means of a plurality of thickness information and a plurality of phase difference information, and determining a correlation equation of a phase difference with respect to thicknesses of the simple layers.

In the method for measuring a thickness, it is preferable that the step of obtaining the phase difference includes: obtaining a third signal value as a reference value from the third interference signal, setting a height, in which the third signal value is obtained with respect to the optical axial direction, as a third height, and setting a phase of the third signal value as a third phase; setting a signal value of the fourth interference signal, which is obtained at a height substantially equal to the third height, as a fourth signal value and setting a phase of the fourth signal value as a fourth phase; and obtaining a phase difference between the third phase and the fourth phase.

In the method for measuring a thickness, it is preferable that the third interference signal and the fourth interference signal are an optical intensity, and the third signal value is a maximum value of the third interference signal.

In the method for measuring a thickness, it is preferable that the correlation equation includes a linear part and a non-linear part.

The method for measuring a thickness further includes the steps of: repeatedly performing the step of obtaining the first interference signal, the step of obtaining the second interference signal, and the step of obtaining the phase difference at a plurality of positions of the boundary surface between the air layer and the base layer and the boundary surface between the subjecting layer and the base layer in a direction that a thickness of the subjecting layer successively changes; obtaining a graph of the phase difference with respect to the plurality of positions; and obtaining an upwrapped phase difference by performing a phase unwrapping process in such a manner that a multiple value of 2π is added to or subtracting from a phase difference of a discontinuity in the graph, wherein, in the step of determining a thickness of the subjecting layer, the unwrapped phase difference is inserted into the correlation equation so as to determine the thickness of the subjecting layer.

In the method for measuring a thickness, it is preferable that the step of obtaining the unwrapped phase difference is performed based on a phase difference on the boundary surface between the air layer and the base layer.

Advantageous Effects

According to the present invention, in a method for measuring a thickness, a difference between the phase of an interference signal generated at a boundary surface between an air layer and a base layer and the phase of an interference signal generated at a boundary surface between a thin layer and a base layer is measured so that thickness below micrometer of a transparent thin layer is accurately measured.

Also, when a correlation equation between a thickness and a phase difference is obtained by using sample layers, which have the same material as a transparent thin layer to be measured and have thicknesses different from each other, it is possible to measure the thickness of a thin layer only by obtaining a phase different between a boundary surface between a transparent thin layer to be measured and a base layer and a boundary surface between an air layer and a base layer. Therefore, processes and time required for measuring the thickness can be reduced.

MODE FOR THE INVENTION

Hereinafter, embodiments of a method for measuring a thickness according to the present invention will be described in detail with reference to the following drawings.

Figure 1:
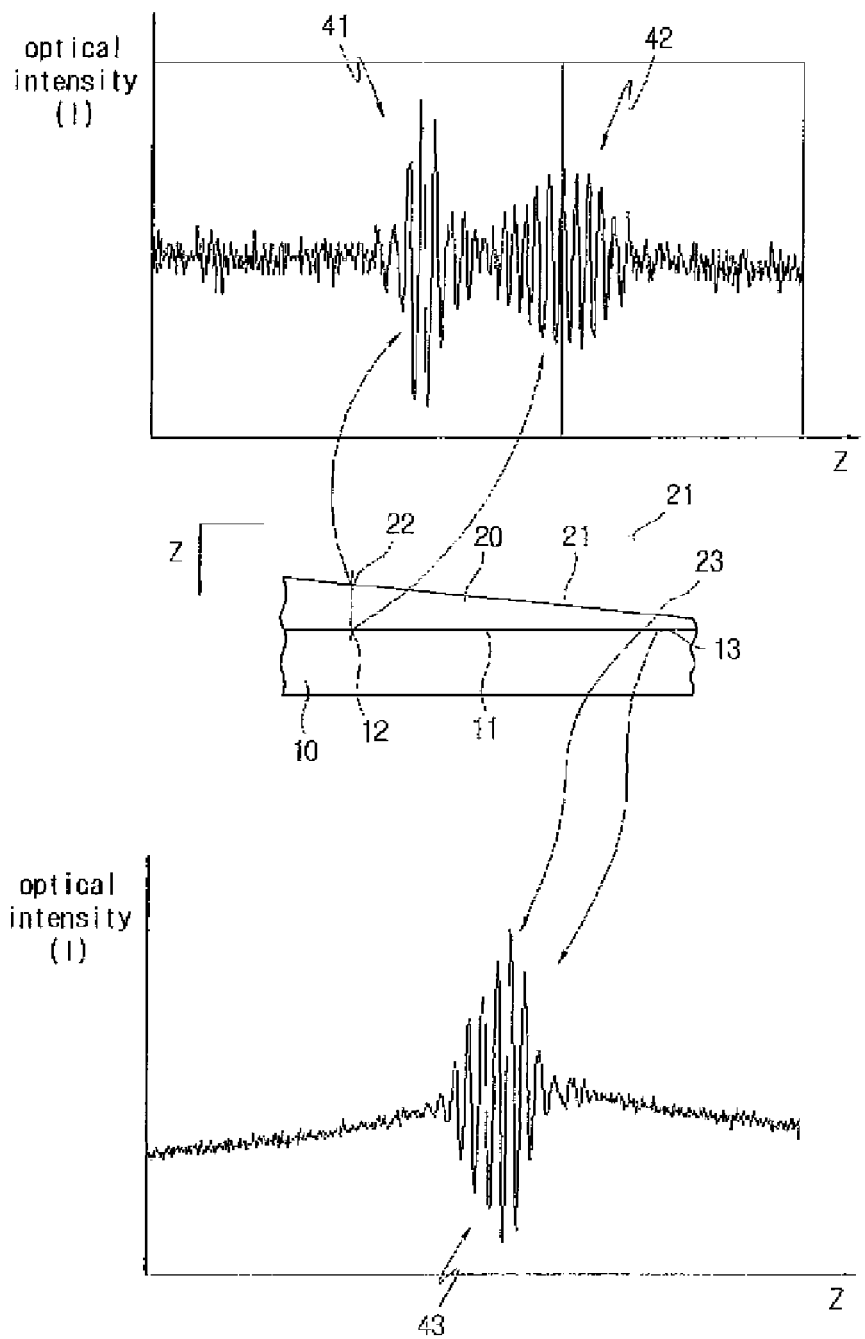
FIG. 1 is a view illustrating a conventional method for measuring a thickness according to an embodiment.
Figure 2:
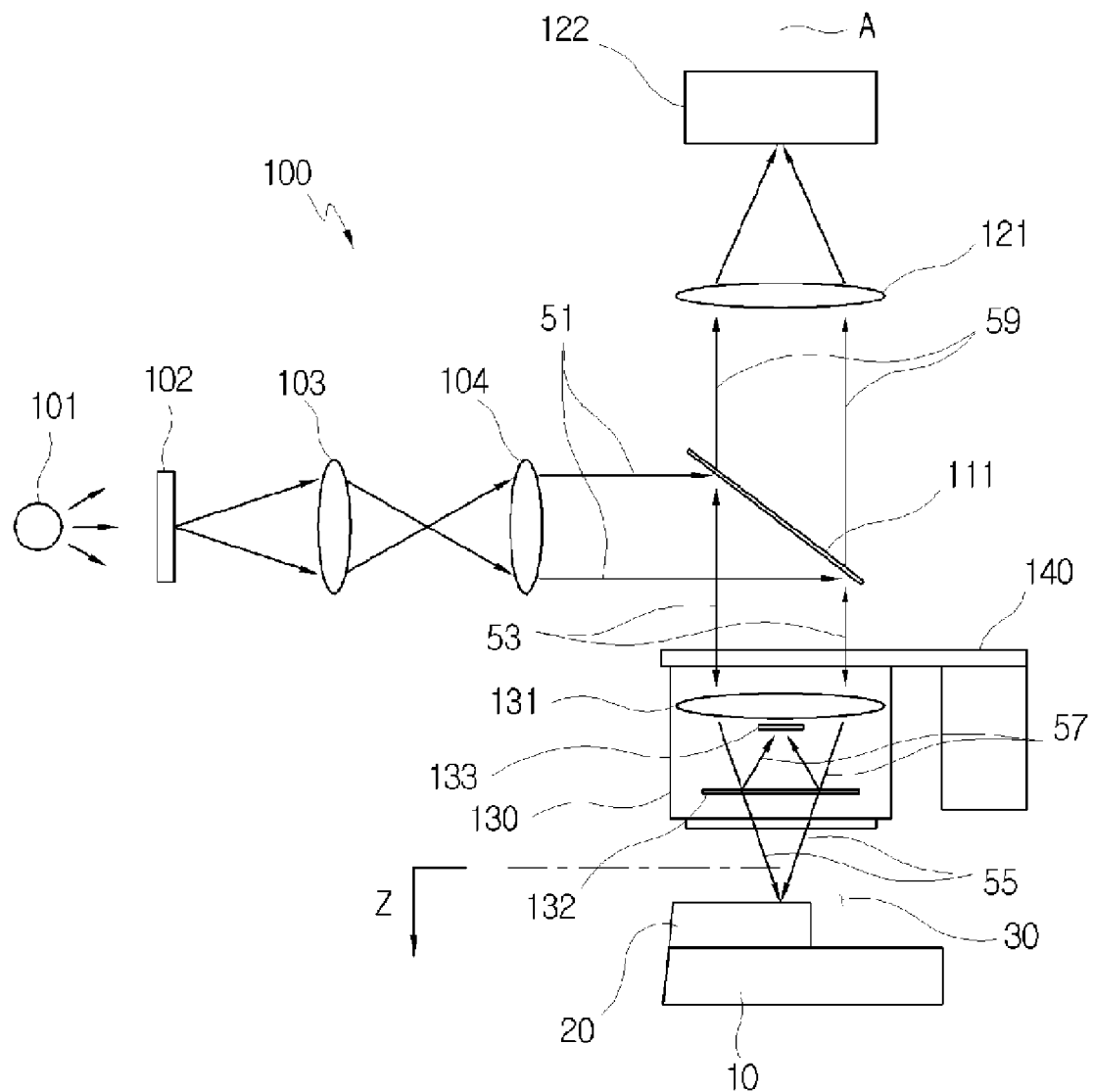
FIG. 2 is a view illustrating an interferometer used for implementing a method for measuring a thickness according to the present invention.

FIG. 2 is a view illustrating an interferometer used for implementing a method for measuring a thickness according to the present invention.

With reference to FIG. 2, the interferometer 100 employs the structure of a mirau interferometer which is typically used for measuring a thickness of a transparent thin layer. The interferometer 100 includes a white optical source 101. A lamp having various kinds of sources, such as a halogen lamp, may be used as the white optical source 101. In order to reduce only brightness of incident light from the white optical source 101 while maintaining the characteristic of a spectrum thereof, an ND filter (Neutral Density filter) is used. The interferometer 100 includes a condenser lens 103 for condensing light passed through the ND filter 102. Light passed through the condenser lens 103 passed through a collimator 104 so as to be parallel light.

A ray passed through the collimator 104 is divided into a reflecting ray 53 and an interference ray 59 by a beam splitter 111, and the reflecting ray 53 enters the substance lens 131. Herein, the beam splitter 111, in which a proportion of reflectivity to transmissivity is 50:50, is used. The incident ray from the substance lens 131 is divided into a reflecting ray 57 and a transmitting ray 55 by the beam splitter 132. The transmitting ray 55 as a measuring ray is irradiated to a subjecting layer 20, which is a transparent thin layer, and a base layer 10. The reflecting ray 57 as a reference ray is irradiated to a reference mirror 133. The beam splitter 132 collects the reflecting ray 57 reflected from the reference mirror 133 and the transmitting ray 55 reflected by the boundary surface between the subjecting layer 20 and the base layer 10. Also, the reference mirror 133 reflects the reflecting ray 57 entering from the beam splitter 132 so as to allow the reflecting ray 57 to enter the beam splitter 132.

The interferometer 100 includes a focusing lens 121 for focusing an interference ray 59 entering from the beam splitter 111 and a detector 122 for detecting an interference signal from the interference ray 59. In general, a charge coupled device camera, which has the proper number of pixels suitable for an area to be detected, is used as the detector 122.

Also, the interferometer 100 includes a driving unit 140 for obtaining an interference signal while moving with a very small interval in a direction crossing the base layer 10 with a measurement point, i.e. in an optical axial direction. A lens barrel 130 receiving the substance lens 131 is mounted in the driving unit 140 so that the lens barrel 130 can move in an optical axial of the substance lens 131 due to the operation of the driving unit 140. Herein, an optical axial direction A that a ray perpendicularly entering the base layer 10 refers to an x-axis in FIG. 2. As such, as the substance lens 131 is moved up and down with the interval of several tens nm while centering the measurement point in the x-axial direction, a position where a strong interference signal is detected is found through the detector 122.

Hereinafter, by using the interferometer 100 structured as described above, an embodiment of a method for measuring a thickness according to the present invention will be described with reference to FIGS. 3 to 10.

Figure 3:
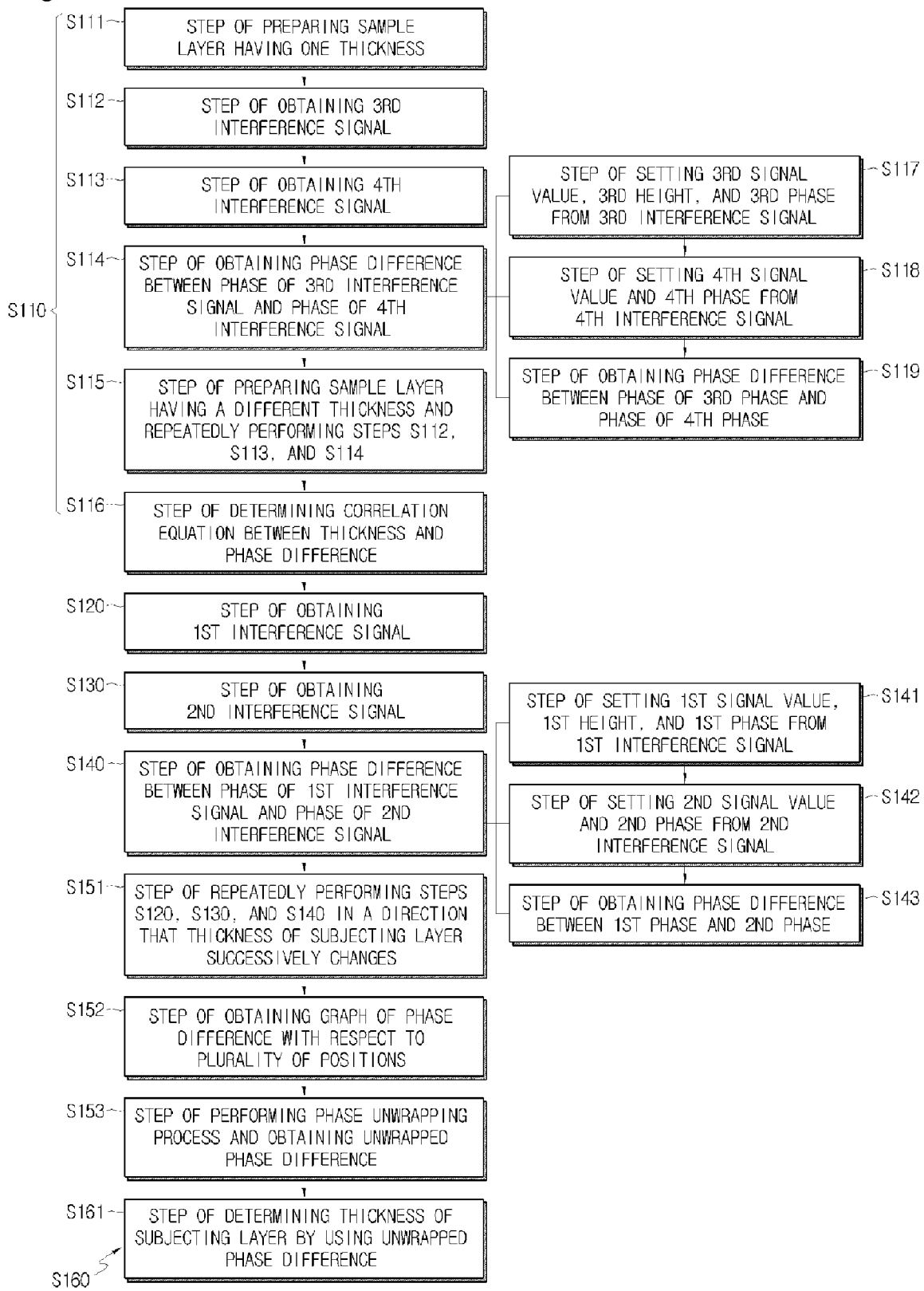
FIG. 3 is a flow chart illustrating the processes of a method for measuring a thickness according to an embodiment of the present invention.
Figure 4:
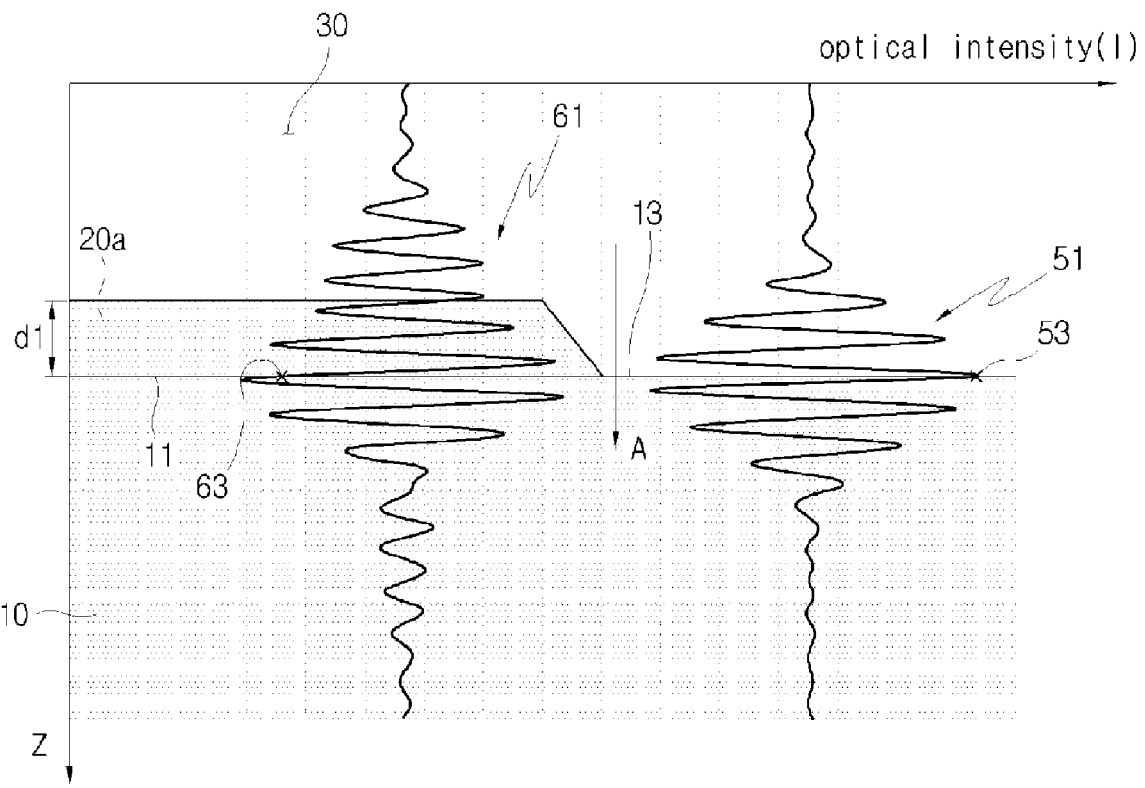
FIGS. 4 and 5 are views illustrating an interference signal obtained by irradiating interference light to sample layers, which are made from material equal to the material of a subject layer and have thicknesses different from each other, and base layers.
Figure 5:
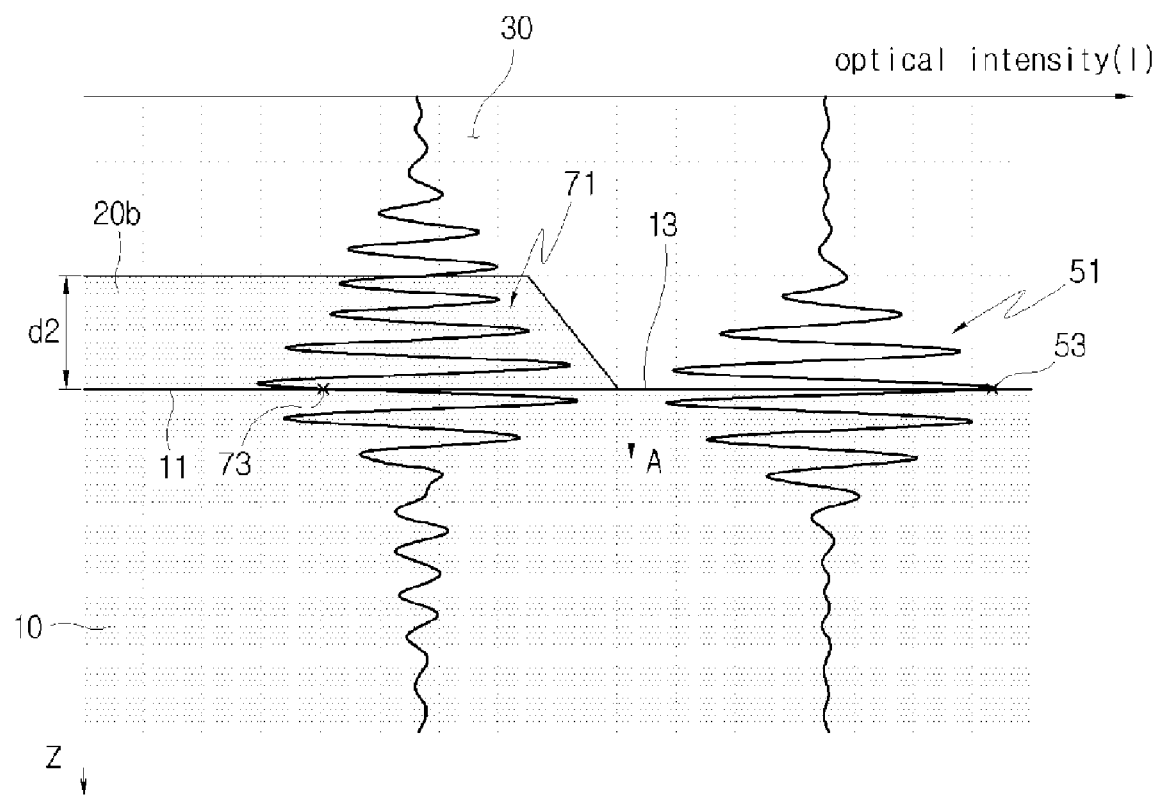
Figure 6:
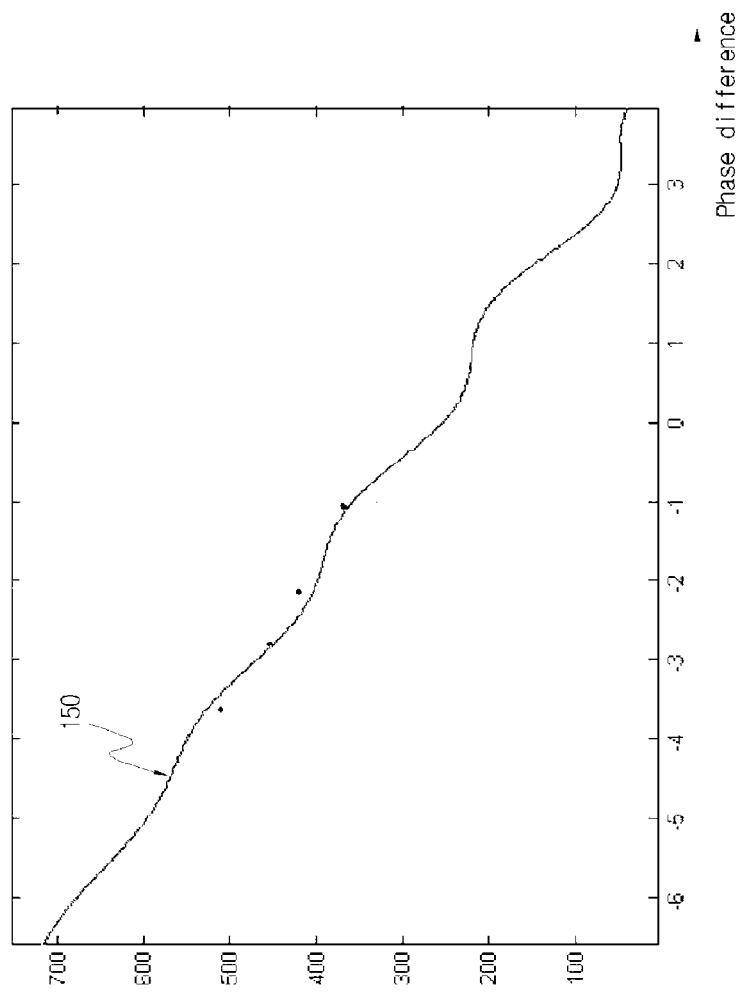
FIG. 6 is a graph illustrating a correlation equation of a phase difference with respect to the thickness of sample layers.
Figure 7:
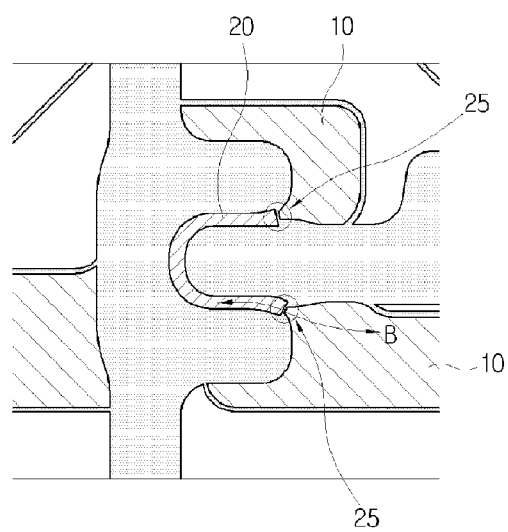
FIG. 7 is a schematic view illustrating a transparent thin layer applied to the method for measuring a thickness shown in FIG. 3.
Figure 8:
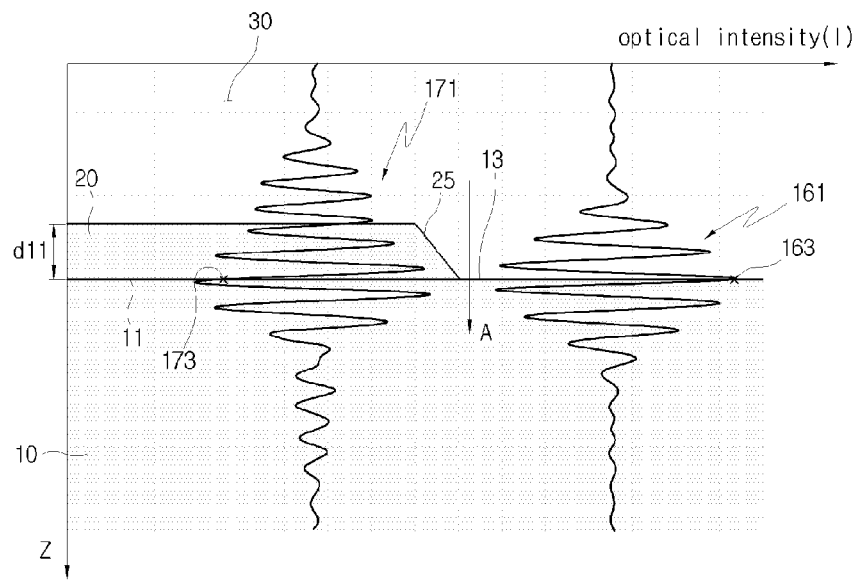
FIG. 8 is a view illustrating the step for obtaining a first interference signal and the step for obtaining a second interference signal in the method for measuring a thickness as shown in FIG. 3.
Figure 9:
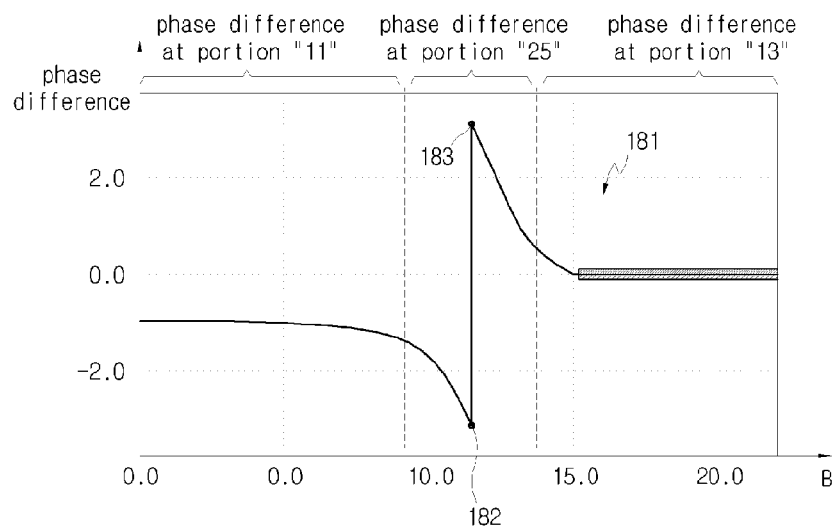
FIG. 9 is a graph illustrating a phase difference with respect to a plurality of positions on a boundary surface between a subjecting layer and a base layer, in which the positions are located in such a direction that the thickness of a base layer successively changes.
Figure 10:
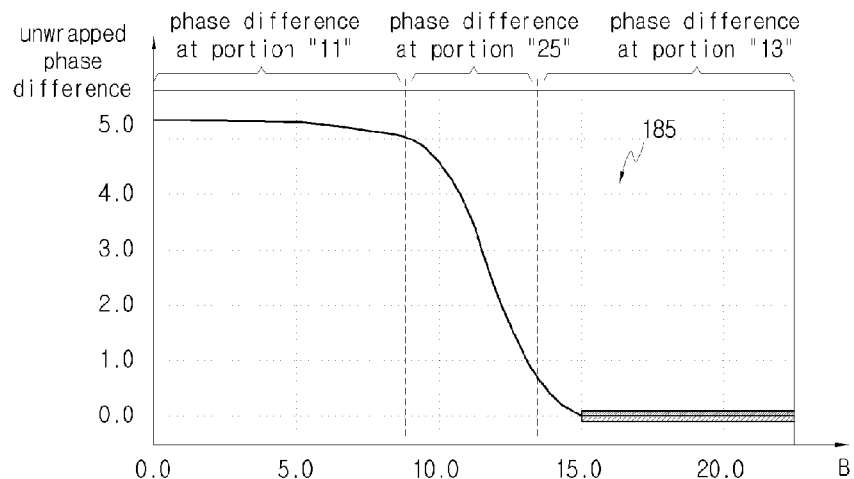
FIG. 10 is a graph illustrating an unwrapped phase difference obtained by performing a phase-unwrapping process to a phase difference of a discontinuity of the graph shown in FIG. 9.

FIG. 3 is a flow chart illustrating a method for measuring a thickness according to an embodiment of the present invention, FIGS. 4 and 5 are views illustrating an interference signal obtained by irradiating interference light to sample layers, which are made from material equal to the material of a subject layer and have thicknesses different from each other, and base layers, and FIG. 6 is a graph illustrating a correlation equation of a phase difference with respect to the thickness of sample layers. Also, FIG. 7 is a schematic view illustrating a transparent thin layer applied to the method for measuring a thickness shown in FIG. 3, FIG. 8 is a view illustrating the step for obtaining a first interference signal and the step for obtaining a second interference signal in the method for measuring a thickness as shown in FIG. 3, FIG. 9 is a graph illustrating a phase difference with respect to a plurality of positions on a boundary surface between a subjecting layer and a base layer, in which the positions are located in such a direction that the thickness of a base layer successively changes, and FIG. 10 is a graph illustrating an unwrapped phase difference obtained by performing restored from a phase difference of a discontinuity of the graph shown in FIG. 9.

In order to measure a thickness of the subjecting layer 20 stacked on the base layer 10 by using the interferometer 100, through a plurality of sample layers 20 and 20b having thickness d1 and d2 different from each other, a correlation equation of a phase difference with respect to the thicknesses of sample layers 20a and 20b is obtained in step S110. Hereinafter, the sample layers 20a and 20b are made from material equal to material of the subjecting layer 20 which is a transparent thin layer 20 to be measured.

In order to obtain a correlation equation 150, firstly, the sample layer 20a a having a thickness d1 is prepared in step S111. Although thickness information regarding the sample layer 20a does not need to be measured through a thickness measuring instrument since it was already been noted, it is possible to obtain the thickness information regarding the sample layer by using another verified thickness measuring instrument.

Hereinafter, as shown in FIG. 4, at one position on a boundary surface 13 where the air layer 30 and the base layer 10 are in contact with each other, a third interference signal 51 with respect to the optical axial direction A perpendicularly to the base layer 10, i.e. with respect to the z-direction is obtained in step S112. In the present embodiment, the third interference signal 51 is a change signal of optical intensity of an interference ray irradiated toward the boundary surface 13 where the air layer 30 and the base layer 10 are in contact with each other. Also, at one position on the boundary surface 13 where the sample layer 20a and the base layer 10 are in contact with each other, the fourth interference signal 61 with respect to the z-direction is obtained in step S113. In the present embodiment, similarly to the third interference signal 51, the fourth interference signal 61 is a change signal of optical intensity of an interference ray irradiated toward the boundary surface 11 where the sample layer 20a and the base layer 10 are in contact with each other.

Then, at positions having heights which are substantially equal to each other in the x-direction, a difference between the phase of the third interference signal 51 and the phase of the fourth interference signal 61 is obtained in step S114.

After obtaining the third interference signal 51, a third signal value 53, which is an optical intensity, is obtained from the third interference signal 51. It is preferably that the maximized value of an optical intensity, which is the third interference signal 51, is set as the third signal value 53. Also, the height where the third signal value 53 is obtained with respect to the z-direction is set as a third height, and the phase of the third signal value 53 is set as a third phase in step S117. Also, after obtaining the fourth reference signal 61, a value of the fourth reference signal 61, which corresponds to a height substantially equal to the third height, is set as the forth signal value 63. Furthermore, the phase where the fourth signal value 63 is obtained is set as a fourth phase in step S118. A difference between the third phase and the fourth phase, which are set as described above, is set as a phase difference between a phase of the third interference signal 51 and a phase of the fourth interference signal 61 in step S119.

Then, as shown in FIG. 5, a sample layer 20b having another thickness d2 is prepared, and step S112 of obtaining the third interference signal 51 with respect to the sample layer 20b, step S113 of obtaining the fourth interference signal 71, and step S114 of obtaining a phase difference between a phase of the third interference signal 51 and a phase of the fourth interference signal 71 are repeatedly performed in step S115. When the repetition is performed with respect to the plurality of sample layers 20a and 20b having the thicknesses d1 and d2 different from each other, a plurality of thickness information and a plurality of phase difference information about the sample layers can be obtained. In order to accurately determine an equation which will be described, a large number of sample layers is preferably secured.

As shown in FIG. 6A, curve line fitting is achieved by using a plurality of thickness information and a plurality of phase difference information which have been obtained as described above, so that a correlation equation 150 of a phase difference with respect to thicknesses of the sample layers is determined in step S116. The correlation equation 150 includes a linear part or a non-linear part, and is defined by equation (1):

$$y=(a \times x+b)+g(x) \qquad (1).$$

Herein, x is a phase difference between a phase of the third interference signal 51 and a phase of the fourth interference signals 61 and 71, and y is the thickness of the sample layers 20a and 20b. As an optimized algorithm for determining each constant value of the linear part and the non-linear part, a nonlinear least square method may be used, and a nonlinear least square method of Levenberg-Marquardt may be also used.

After obtaining the correlation equation 150, as shown in FIGS. 7 and 8, the procedure for measuring a thickness of a measurement object to be measured, including the subjecting layer 20 of which an actual thickness will be measured, is performed. The measurement object includes a portion where the subjecting layer 20 is stacked on the base layer 10, and the air layer 30 is disposed on the subjecting layer 20, a portion where the air layer 30 and the base layer 10 are in direct contact with each other without the subjecting layer 20, and a slanting part 25 where the thickness of the subjecting layer 20 successively changes from zero to a predetermined thickness d11 between the two portions. Herein, the subjecting layer 20 has a thickness thin enough to allow overlapping between the maximized value of an interference signal at the boundary surface between the air layer 30 and the subjecting layer 20 and the maximized value of an interference signal at the boundary surface between the subjecting layer 20 and the base layer 101. Actually, the subjecting layer 20 is a transparent thin layer having a thickness below of 1 μm.

In order to measure a thickness of the subjecting layer 20, at one position of the boundary surface between the air layer 30 and the base layer 10, the first interference signal 161 with respect to the optical axial direction perpendicular to the base layer 10, i.e. the x-direction, is obtained in step S120. In the present embodiment, the first interference signal 161 is a change signal of optical intensity of an interference ray irradiated toward the boundary surface 13 where the air layer 30 and the base layer 10 are in contact with each other. Also, at one position of a boundary surface 11 where the subjecting layer 20 and the base layer 10 are in contact with each other, the second interference signal 171 with respect to the z-direction is obtained in step S130. In the present embodiment, similarly to the first interference signal 161, the second interference signal 171 is a change signal of optical intensity of an interference ray irradiated toward the boundary surface 11 where the subjecting layer 20 and the base layer 10 are in contact with each other.

After this, a phase difference between a phase of the first interference signal 161 and a phase of the second interference signal 171, which obtained at respective positions substantially equal to each other along the z-direction, is obtained in step S140.

After obtaining the first interference signal 161, a first signal value 163, which is an optical intensity, is obtained from the first interference signal 161. It is preferably that the maximized value of an optical intensity, which is the first interference signal 161, is set as the first signal value 163. Also, a height where the first signal value 163 is obtained with respect to the z-direction is set as the first height, and the phase of the first signal value 163 is set as the first phase in step S141. Also, after obtaining the second interference signal 171, the value of the second interference signal 171, which corresponds to a height substantially equal to the first height, is set as the second signal value 173. Also, a phase where the second signal value 173 is obtained is set as the second phase in step S142. A difference between the first phase and the second phase which have been set as described above is set as a phase difference between a phase of the first interference signal 161 and a phase of the second interference signal 171.

Before the phase difference between a phase of the first interference signal 161 and a phase of the second interference signal 171 is directly inserted into the correlation equation 150, it is preferable that a phase difference obtained through phase un-wrapping process to the phase difference is inserted in the correlation equation 150.

When step S120 of obtaining the first interference signal 161 at a plurality of positions on the boundary surface 13 between the air layer 30 and the base layer 10 and the boundary surface 11 between the subjecting layer 20 and the base layer 10 in such a direction that the thickness of the subjecting layer 20 successively changes, i.e. in the direction B shown in FIG. 7, step S130 of obtaining the second interference signal 171, and step S140 of obtaining a phase difference between a phase of the first interference signal 161 and a phase of the second interference signal 171 are repeatedly performed in step S151, a plurality of phase difference information can be obtained.

When a graph of a phase difference with respect to the direction B is obtained by using the plurality of phase difference information, the graph is the same as a graph 181 shown in FIG. 9 which can be obtained in step S152. Herein, a phase on the boundary surface 13 between the air layer 30 and the base layer 10 is set as a reference value, and the reference value is set to zero. As shown in FIG. 9, a phase difference between the phase of the first signal value 163 and the phase of the second signal value 173 has a value determined within the range of −π~+π so that discontinuity is generated near a phase difference having a value of −π or near a phase difference having a value of +π. A phase difference in such a discontinuity does not reflect an actual phase difference, and a discontinuity is generated based on the fact that a phase difference is determined within the range of −π~+π. When change of a phase difference is obtained in the direction B that the thickness of the subjecting layer 20 successively changes, although a lower discontinuity 182 and an upper discontinuity 183 aren't equal to each other on the graph 181, it can be inferred that the lower discontinuity 182 and the upper discontinuity 183 are points equal to each other, based on the shape of the slanting part 25 of the subjecting layer 20.

Therefore, a phase unwrapping process for adding 2π to a phase difference value of the lower discontinuity 182 in the graph 181 so as to allow the lower discontinuity 182 to correspond to the upper discontinuity is performed, and in step S153, a phase difference, which has been unwrapped, is obtained as shown in FIG. 10. Herein, during the phase unwrapping process, a phase difference on the boundary surface 13 between the air layer 30 and the base layer 10 is a reference value. That is, while maintaining a portion of the graph, which includes a phase difference on the boundary surface 13 between the air layer 30 and the base layer 10, the phase unwrapping process is performed in such a manner that $2\pi$ is added to each phase difference of portions of the graph, which include a phase difference at the boundary surface 11 between the subjecting layer 20 and the base layer 10. A graph 185 reflecting each actual phase difference at all positions, which is measured through such a phase unwrapping process can be obtained. It is also possible that a phase unwrapping process is performed in such a manner that a multiple value of $2\pi$, such as $4\pi$ or $6\pi$, is added to a discontinuity according to the shape of the graph.

Then, the phase difference is inserted in the correlation equation 150 so that a thickness d11 of the subjecting layer 20 is determined in step S160. It is preferable that the unwrapped phase difference is inserted into the correlation equation 150 in step S161.

Although an exemplary embodiment of the present invention has been described for illustrative purposes, those skilled in the art will appreciate that various modifications, additions and substitutions are possible, without departing from the scope and spirit of the invention as disclosed in the accompanying claims.

Industrial Applicability

In the method for measuring a thickness, which is structured as described above, according to an embodiment of the present invention, the thickness of a thin layer is measured by using a phase difference between the phase of an interference signal at a boundary surface between an air layer and a base layer and the phase of an interference signal at a boundary surface between a transparent thin layer and the base layer, so that thickness of a transparent thin layer of a thickness having a unit below micrometer is accurately measured.

Also, when a correlation equation between a thickness of a transparent thin layer and a phase difference with respect to the boundary surface between the transparent thin layer and the base layer, is obtained, a thickness of the thin layer can be measured only by obtaining a phase difference of a thin layer made from material equal to the material of a sample layer. Therefore, procedures and time required for measuring a thickness can be reduced.

The invention claimed is:

1. A method for measuring a thickness of a subjecting layer attached on a base layer by means of an interferometer, comprising the steps of:
    obtaining a correlation equation of a phase difference with respect to thicknesses of sample layers, the thicknesses being different from each other, the sample layers being made from a material substantially equal to a material of the subjecting layer;
    obtaining a first interference signal with respect to an optical axial direction incident to the base layer at a boundary surface between an air layer and the base layer;
    obtaining a second interference signal with respect to the optical axial direction at a boundary surface between the subjecting layer and the base layer;
    obtaining a phase difference between a phase of the first interference signal and a phase of the second interference signal at respective heights substantially equal to each other with respect to the optical axial direction; and
    determining a thickness of the subjecting layer by inserting the phase difference into the correlation equation.

2. The method for measuring a thickness as claimed in claim 1, wherein the step of obtaining a phase difference between a phase of a first interference signal and a phase of a second interference signal comprises:
    obtaining a first signal value as a reference value from the first interference signal, setting a height, in which the first signal value is obtained with respect to the optical axial direction, as a first height, and setting a phase of the first signal value as a first phase;
    setting a signal value of the second interference signal, which is obtained at a height substantially equal to the first height, as a second signal value, and setting a phase of the second signal value as a second phase; and
    obtaining a phase difference between the first phase and the second phase.

3. The method for measuring a thickness as claimed in claim 2, wherein the first interference signal and the second interference signal are an optical intensity, and the first signal value is a maximum value of the first interference signal.

4. The method for measuring a thickness as claimed in claim 1, wherein the step of obtaining the correlation equation comprises:
    preparing a sample layer having one thickness;
    obtaining a third interference signal with respect to the optical axial direction at the boundary between the air layer and the base layer;
    obtaining a fourth interference signal with respect to the optical axial direction at a boundary surface between the sample layer and the base layer;
    obtaining a phase difference between a phase of the third interference signal and a phase of the fourth interference signal at respective heights substantially equal to each other with respect to the optical axial direction;
    preparing a sample layer having another thickness and repeatedly performing the step of obtaining the third interference signal, the step of obtaining the fourth interference signal, and the step of obtaining the phase difference with respect to the sample layer;
    performing a curve line fitting by means of a plurality of thickness information and a plurality of phase difference information, and determining a correlation equation of a phase difference with respect to thicknesses of the simple layers.

5. The method for measuring a thickness as claimed in claim 4, wherein the step of obtaining the phase difference comprises:
    obtaining a third signal value as a reference value from the third interference signal, setting a height, in which the third signal value is obtained with respect to the optical axial direction, as a third height, and setting a phase of the third signal value as a third phase;
    setting a signal value of the fourth interference signal, which is obtained at a height substantially equal to the third height, as a fourth signal value and setting a phase of the fourth signal value as a fourth phase; and
    obtaining a phase difference between the third phase and the fourth phase.

6. The method for measuring a thickness as claimed in claim 5, wherein the third interference signal and the fourth interference signal are an optical intensity, and the third signal value is a maximum value of the third interference signal.

7. The method for measuring a thickness as claimed in claim 4, wherein the correlation equation includes a linear part and a non-linear part.

8. The method for measuring a thickness as claimed in claim 1, further comprising the steps of:
    repeatedly performing the step of obtaining the first interference signal, the step of obtaining the second interference signal, and the step of obtaining the phase difference at a plurality of positions of the boundary surface between the air layer and the base layer and the boundary surface between the subjecting layer and the base layer in a direction that a thickness of the subjecting layer successively changes;

obtaining a graph of the phase difference with respect to the plurality of positions; and performing a phase unwrapping process by adding a multiple value of $2\pi$ to or subtracting a multiple value of $2\pi$ from a phase difference at a discontinuity in the graph and obtaining an unwrapped phase difference, wherein, in the step of determining a thickness of the subjecting layer, the unwrapped phase difference is inserted into the correlation equation so as to determine the thickness of the subjecting layer.

9. The method for measuring a thickness as claimed in claim 8, wherein the step of obtaining the unwrapped phase difference is performed based on a phase difference on the boundary surface between the air layer and the base layer.

* * * * *